United States Patent
Mulhall (10) Patent No.: US 10,533,700 B1
(45) Date of Patent: Jan. 14, 2020

(54) MULTI-FUNCTIONAL HANDLE SYSTEM

(71) Applicant: Michael Mulhall, Irvine, CA (US)

(72) Inventor: Michael Mulhall, Irvine, CA (US)

( * ) Notice: Subject to any disclaimer, the term of this patent is extended or adjusted under 35 U.S.C. 154(b) by 0 days.

(21) Appl. No.: 16/197,224

(22) Filed: Nov. 20, 2018

(51) Int. Cl.
  *F16M 11/12* (2006.01)
  *F16M 13/00* (2006.01)
  *H04M 1/04* (2006.01)
  *F16M 11/04* (2006.01)

(52) U.S. Cl.
  CPC ........... *F16M 11/12* (2013.01); *F16M 11/041* (2013.01); *F16M 13/00* (2013.01); *H04M 1/04* (2013.01)

(58) Field of Classification Search
  CPC ...... F16M 11/12; F16M 11/041; F16M 13/00; F16M 11/06; F16M 11/121; F16M 11/125; F16M 11/126; F16M 11/128; A45F 5/10; A45F 2005/108; A45F 2005/1093; A45F 2005/025; H04M 1/06; H05K 5/023; H05K 5/0234; A45C 2011/002
  See application file for complete search history.

(56) References Cited

U.S. PATENT DOCUMENTS

| | | | |
|---|---|---|---|
| 8,382,059 B2 | 2/2013 | Le Gette et al. | |
| 9,277,038 B1 | 3/2016 | Wheatley | |
| 9,723,735 B1 | 8/2017 | Kim | |
| 2007/0075208 A1 | 4/2007 | Chen | |
| 2012/0168577 A1* | 7/2012 | Cheng | F16M 11/105 248/176.3 |
| 2012/0234055 A1* | 9/2012 | Bland, III | E05B 73/0082 70/15 |
| 2013/0286623 A1 | 10/2013 | Slipy et al. | |
| 2016/0295716 A1* | 10/2016 | Chen | F16M 13/005 |

* cited by examiner

*Primary Examiner* — Christopher Garft
(74) *Attorney, Agent, or Firm* — John D. Tran; Rhema Law Group, P.C.

(57) ABSTRACT

A multi-functional handle system and method can include: providing a base component; rotateably affixing a middle component to the base component; and coupling a handle to the middle component, and the handle including: a closed configuration with the middle component within a recess of the handle, a handle magnet and a middle component magnet engaged, and the handle and the middle component secured in one position relative to the base component based on the base component being in contact with the handle within the recess, a semi-closed configuration with the handle rotateable with respect to the base component, and an open configuration with the handle freely moveable about a hinge pin based on the handle magnet and the middle component magnet not being engaged.

20 Claims, 8 Drawing Sheets

MULTI-FUNCTIONAL HANDLE SYSTEM

TECHNICAL FIELD

This disclosure relates to a multi-functional handle system, more particularly to a handle system for mounting to electronic devices.

BACKGROUND

Mobile electronic devices, such as tablets, smart phones or other computing devices are widely used for various applications. It is often desirable to be able to use such devices at a distance. For example, it is often desirable to be able to hold the device at a distance in order such that the user can take a photograph or video of him or herself. In addition, the user may wish to hold the mobile device at a distance in order to take a photograph or a video from a vantage point above the user. For example, if the user is attending a concert, they may wish to take a photograph or video of the stage, which would necessitate holding the device above the crowd present at the event.

Users may also wish to hold their mobile devices at a distance in order to view media such as movies, television shows, or videos, play games or to talk on the telephone. However, it can be tiresome and painful to hold devices steady for an extended period of time. Wrist and hand injuries are currently on the rise as a result of using mobile devices. Holding the device for an extended period of time can cause and exacerbate such injuries. Additionally, it is often quite cumbersome to carry additional accessories such as selfie-sticks, in order to assist in a user in taking pictures and videos that would be difficult by holding the phone by their hand.

Accordingly, it is desirable to have an attachment that may be secured to the mobile device, in order to keep the device secure and steady, while allowing it to be used from a distance. In addition, it may be desirable to be able to rotate the mobile device when using it at a distance.

For example, the user may wish to take photographs or videos from different angles, or view content on the device's screen while sitting, reclining, or in a variety of different positions. However, it can be difficult to hold the device securely and steadily in such positions, without risking the safety of the device, or causing the user's hand, wrist, or arm to be placed under stress.

It is therefore desirable to have an attachment that may be affixed to the mobile device in order to facilitate such use from a distance, and in order to stabilize the device for long periods of use. Existing attachments, commonly known as selfie sticks currently exist in the art.

However, such existing attachments have numerous drawbacks. For example, many existing attachments are bulky, and are not easily transported along with the mobile device. Many existing mobile devices, such as smart phones, are small and lightweight, and can easily fit into the user's pocket. However, existing attachments are often larger than the mobile device, and cannot be held in a pocket or other small space along with the mobile device.

In addition, other existing attachments do not hold the mobile device securely, and the user therefore runs the risk of dropping his or her mobile device when using it from a distance. Existing attachments likewise have the drawback that they do not allow the user to easily rotate the device, in order to take photos, view content, play games or otherwise use the device in various positions and at various angles.

In addition, given that such attachments are commonly used to take photographs, including of the user as well as other people who may be with the user at the time of the photograph, it is desirable to have image checks and alignment, in order to ensure the best possible photograph. Existing devices have the drawback that they do not have image checks and alignment designed into the structure of the devices.

Stands exist in the art that allow the user to hold a mobile device steady for longer periods of use, such as watching video content on the device, reading content on the device, or having a telephone call. However, such devices also have the drawback that they are not easily transported with the mobile device, without adding significant bulk or weight to the device. Such stands also have the drawback that they do not simultaneously function as a handle for facilitating use at a distance, and therefore require the user to purchase and carry multiple attachments. In addition, existing stands for mobile electronic devices are required to rest of a flat, rigid surface in order to hold the device in its desired position.

Solutions have been long sought but prior developments have not taught or suggested any complete solutions, and solutions to these problems have long eluded those skilled in the art. Thus there remains a considerable need for devices employing miniaturized and structurally rigid component design, while simultaneously providing multi-functional utility.

SUMMARY

A multi-functional handle system and methods, employing miniaturized and structurally rigid component design, while simultaneously providing multi-functional utility, are disclosed. The handle system and methods can include: a base component having a base component circular cutout and a device facing surface, the device facing surface for coupling the base component in a fixed position relative to the mobile device; a screw extended through the base component circular cutout; a middle component having a middle component circular cutout, a middle component magnet, and a hinge hole, the middle component rotatably affixed to the base component with the screw extended through the base component circular cutout and through the middle component circular cutout; a hinge pin extended through the hinge hole of the middle component; and a handle having a hinge anchor hole, a handle magnet, and a recess, the hinge anchor hole along a side wall of the recess, the handle magnet within the recess, the handle hingeably affixed to the middle component with the hinge pin extended from the hinge hole of the middle component into the hinge anchor hole of the handle, and the handle including: a closed configuration with the middle component within the recess, the handle magnet and the middle component magnet engaged, and the handle and the middle component secured in one position relative to the base component based on the base component being in contact with the handle within the recess, a semi-closed configuration with the handle rotatable with respect to the base component based on the base component being outside the recess, and with the handle magnet and the middle component magnet being engaged, and an open configuration with the handle rotatable with respect to the base component based on the base component being outside the recess, and the handle freely moveable about the hinge pin based on the handle magnet and the middle component magnet not being engaged.

Other contemplated embodiments can include objects, features, aspects, and advantages in addition to or in place of those mentioned above. These objects, features, aspects, and advantages of the embodiments will become more apparent from the following detailed description, along with the accompanying drawings.

BRIEF DESCRIPTION OF THE DRAWINGS

The handle system is illustrated in the figures of the accompanying drawings which are meant to be exemplary and not limiting, in which like reference numerals are intended to refer to like components, and in which.

DETAILED DESCRIPTION

In the following description, reference is made to the accompanying drawings that form a part hereof, and in which are shown by way of illustration, embodiments in which the handle system may be practiced. It is to be understood that other embodiments may be utilized and structural changes may be made without departing from the scope of the handle system.

When features, aspects, or embodiments of the handle system are described in terms of steps of a process, an operation, a control flow, or a flow chart, it is to be understood that the steps can be combined, performed in a different order, deleted, or include additional steps without departing from the handle system as described herein.

The handle system is described in sufficient detail to enable those skilled in the art to make and use the handle system and provide numerous specific details to give a thorough understanding of the handle system; however, it will be apparent that the handle system may be practiced without these specific details.

In order to avoid obscuring the handle system, some well-known system configurations and descriptions are not disclosed in detail. Likewise, the drawings showing embodiments of the system are semi-diagrammatic and not to scale and, particularly, some of the dimensions are for the clarity of presentation and are shown greatly exaggerated in the drawing FIGs. Generally, the handle system can be operated in any orientation.

Figure 1:
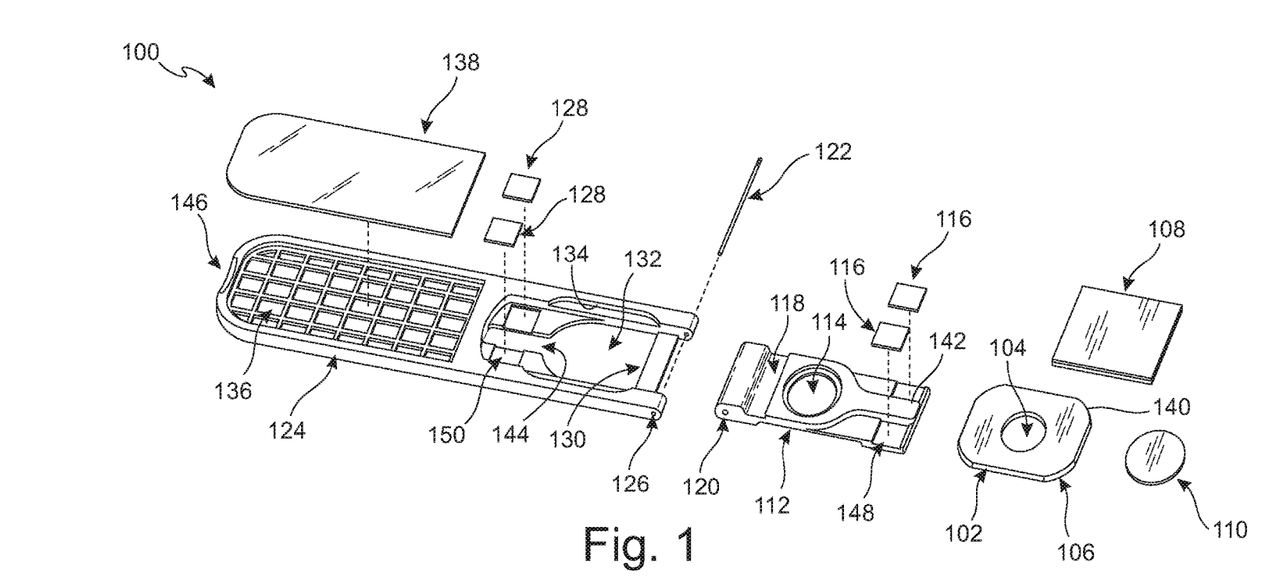
FIG. 1 is an exploded isometric view of the handle system.

Referring now to FIG. 1, therein is shown an exploded isometric view of the handle system 100. The handle system 100 is shown including a base component 102 having a base component circular cutout 104 and a device facing surface 106.

The base component circular cutout 104 can for example be a threaded hole. The device facing surface 106 for coupling the base component 102 in a fixed position relative to a mobile device, such as the user device 802 of FIG. 8.

The device facing surface 106 should be understood to face the user device 802 for coupling the base component 102 to the user device 802. The coupling of the device facing surface 106 of the base component 102 to the user device 802 can be achieved in a number of ways including integrally forming the base component 102 and portion of the user device 802 from a continuous material, with an adhesive 108, or through the coupling of a cell-phone case. When integrally formed with the user device 802 from a continuous material, the device facing surface 106 should be understood to be a cross sectional surface of the integrally formed base component 102, the cross-sectional surface being co-planar with portions of the user device 802 surrounding the base component 102.

A screw 110 can be extended through and threaded into the base component circular cutout 104. A middle component 112 having a middle component circular cutout 114, middle component magnets 116, a support bar recess 118, and a hinge hole 120. The middle component 112 can be rotatably affixed to the base component 102 with the screw 110 threaded into the base component circular cutout 104 and through the middle component circular cutout 114. The screw can be fixed with respect to the base component 102 and rotatably affixed to the middle component 112.

The base component 102 can be extended past the middle component 112 in a direction coplanar with the device facing surface 106. A hinge pin 122 can be extended through the hinge hole 120 of the middle component 112.

The handle system 100 can further be depicted as including a handle 124 having hinge anchor holes 126, handle magnets 128, a support bar 130, and a recess 132. The support bar 130 can extend across the recess 132. The hinge anchor holes 126 can be positioned along a side wall 134 of the recess 132.

The handle magnets 128 can be mounted within the recess 132. The handle 124 can be hingeably affixed to the middle component 112 with the hinge pin 122 extended from the hinge hole 120 of the middle component 112 into the hinge anchor holes 126 of the handle 124.

The handle 124 can further be shown to include raised support structures 136 within a portion of the handle 124 adjacent to the recess 132. The raised support structures 136 can ensure exact, proper, and flat mounting of a mirror 138, which can be affixed thereto. The raised support structures 136 can further reduce warping and greatly increase the structural rigidity of the handle system 100.

Figure 4:
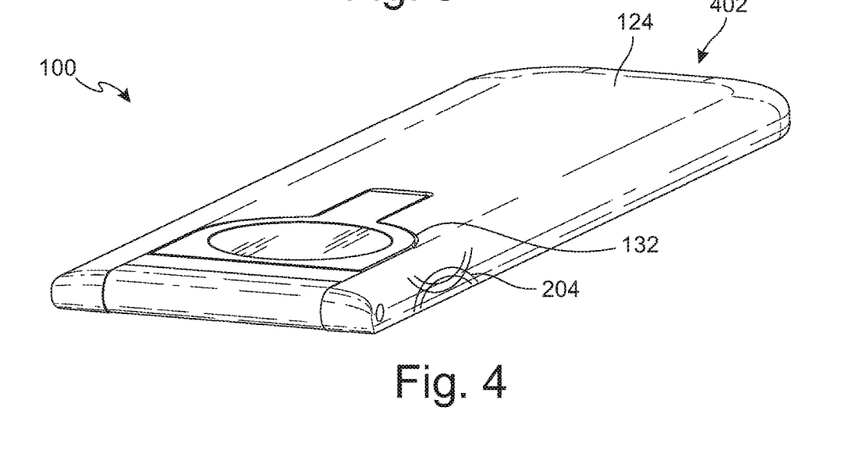
FIG. 4 is an isometric view of the exterior side of the handle system in a closed configuration.
Figure 5:
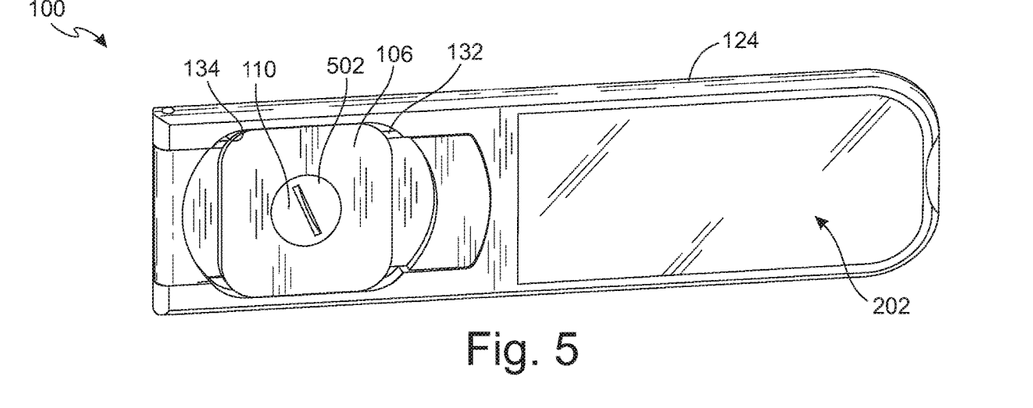
FIG. 5 is an isometric view of the interior side of the handle system in the closed configuration.

The mirror 138 can be affixed to the handle 124 and can be affixed to a surface of the handle 124 facing the same direction as the device facing surface 106 when the handle 124 is in a closed configuration, as is illustratively depicted in FIGS. 4 and 5, for example.

Figure 6:
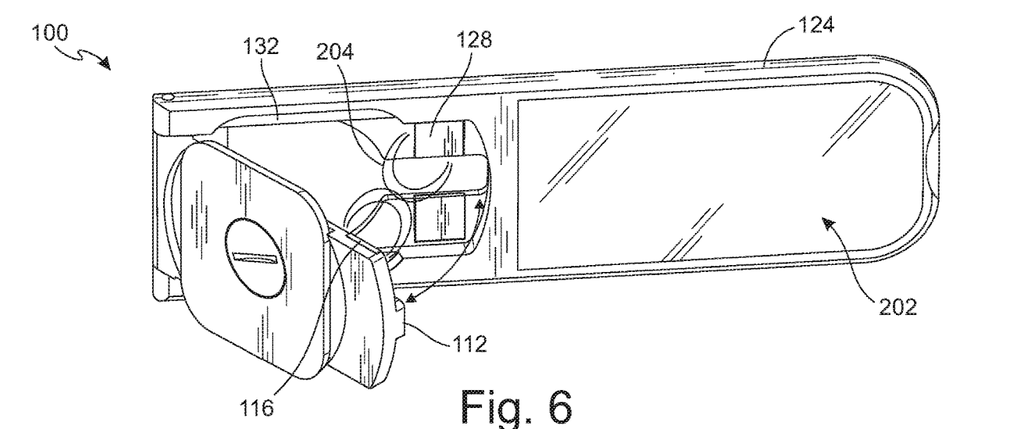
FIG. 6 is an isometric view of the interior side of the handle system in a semi-closed configuration.
Figure 7:
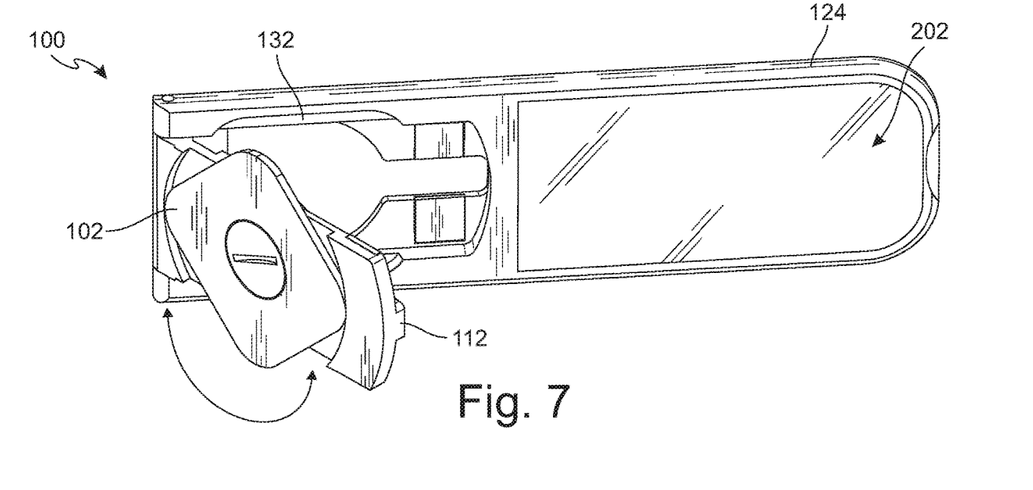
FIG. 7 is an isometric view of the interior side of the handle system in the semi-closed configuration.

The base component 102 is depicted including beveled corners 140 for smoother rotation of the handle 124 relative to the base component 102 when the handle is in the semi-closed configuration, as illustrated in FIGS. 6 and 7, for example.

The middle component 112 can further include a medial ridge 142 extended up away from the base component 102 when coupled to the base component 102 with the screw 110. The handle 124 can include a corresponding medial ridge hole 144 within the recess 132.

The medial ridge 142 can extend into the medial ridge hole 144 when the handle is in the closed configuration. When in the closed configuration the medial ridge hole 144 and the medial ridge 142 can provide a friction fit or a snap allowing the handle 124 to stay in a closed configuration until enough force is applied to overcome the friction fit or snap and reconfiguring the handle system from the closed configuration to the open or semi-closed configurations. The handle 124 is further shown to include a finger groove 146 at an end of the handle 124 opposite the hinge anchor hole 126.

The middle component magnets 116 can be mounted within middle component magnet pockets 148 positioned on either side of the medial ridge 142. The handle magnets 128 can be mounted within handle magnet pockets 150 positioned on either side of the medial ridge hole 144 and within the recess 132.

Figure 2:
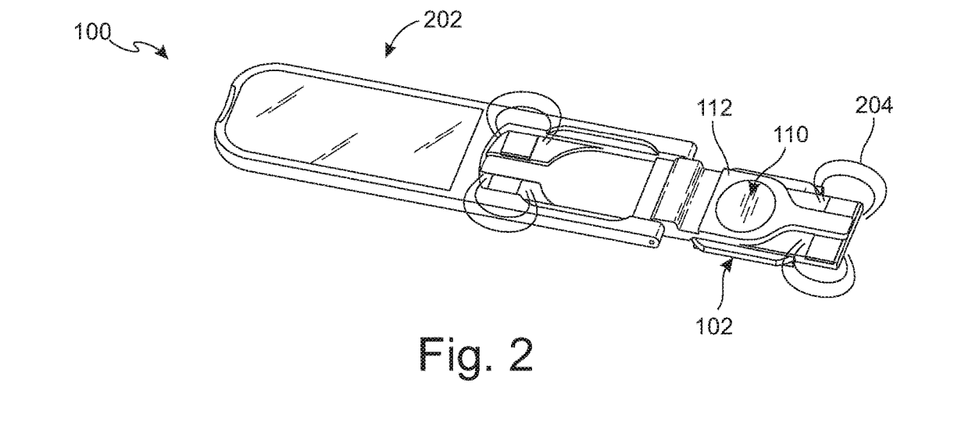
FIG. 2 is an isometric view of an interior side of the handle system in an open configuration.

Referring now to FIG. 2, therein is shown an isometric view of an interior side 202 of the handle system 100 in an open configuration. The interior side 202 of the handle system can include the mirror 138 and the recess 132 of the handle 124.

The middle component 112 can be rotatably affixed to the base component 102 with the screw 110 threaded into the base component circular cutout 104 of FIG. 1 and through the middle component circular cutout 114 of FIG. 1.

The base component 102 is depicted as extended past the middle component 112 in a direction coplanar with the device facing surface 106. The handle system is shown in an open configuration.

The open configuration including the handle 124 rotatable with respect to the base component 102 based on the base component 102 being outside the recess 132, and the handle 124 freely moveable about the hinge pin 122 based on the handle magnets 128 and the middle component magnets 116 not being engaged with each other.

As used herein the handle magnets 128 and the middle component magnets 116 are considered engaged when magnetic fields 204 interact with one another. That is when the magnetic field 204 of the handle magnets 128 and the magnetic field 204 of the middle component magnets 116 interact producing a force the handle magnets 128 and the middle component magnets 116 are to be considered engaged.

Here, the magnetic fields 204 of the handle magnets 128 and the middle component magnets 116 are not engaged or interacting. The handle system 100 is therefore considered to be in the open configuration.

Figure 3:
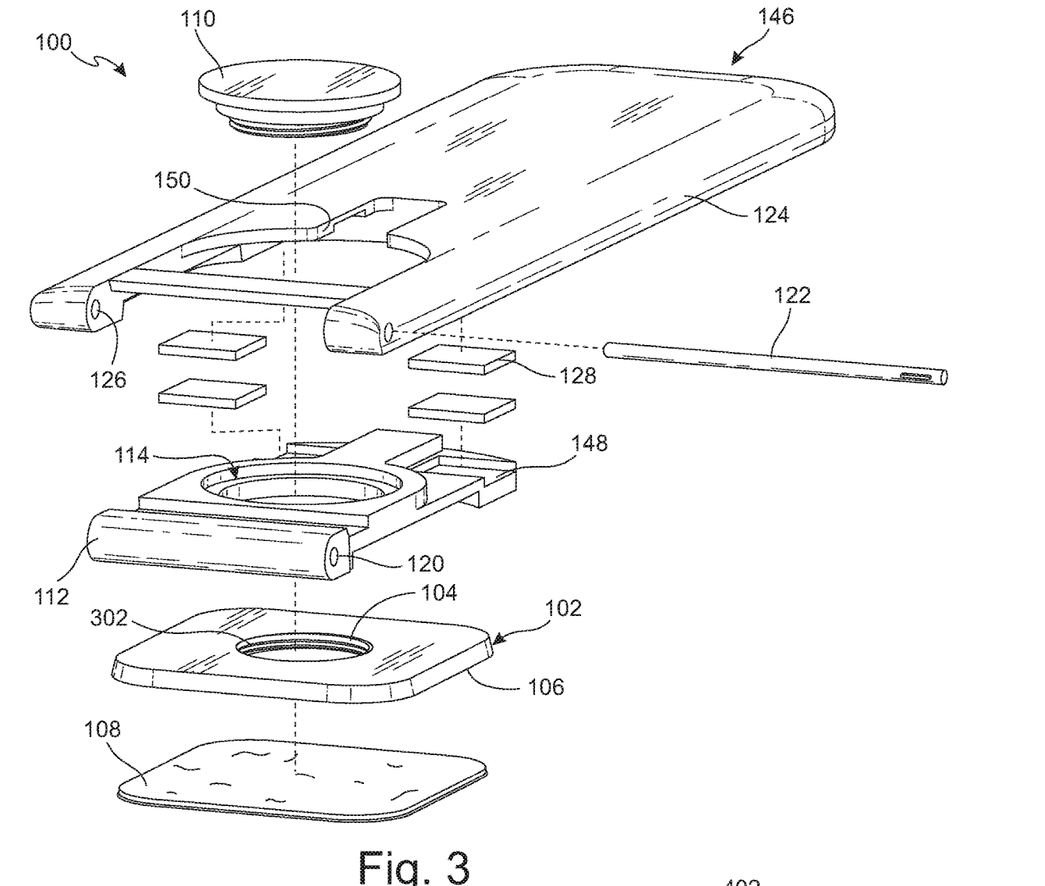
FIG. 3 is an exploded isometric view of the handle system.

Referring now to FIG. 3, therein is shown an exploded isometric view of the handle system 100. The handle system 100 is depicted in an unassembled form. The handle 124 can be preferably formed from a lightweight plastic, though other comparable materials may also be used. The handle 124 comprises the arm or handle portion of the device of the present disclosure. The handle 124 may preferably be between 1.25 inches in width and 4 inches in length, though other dimensions are also contemplated.

Figure 8:
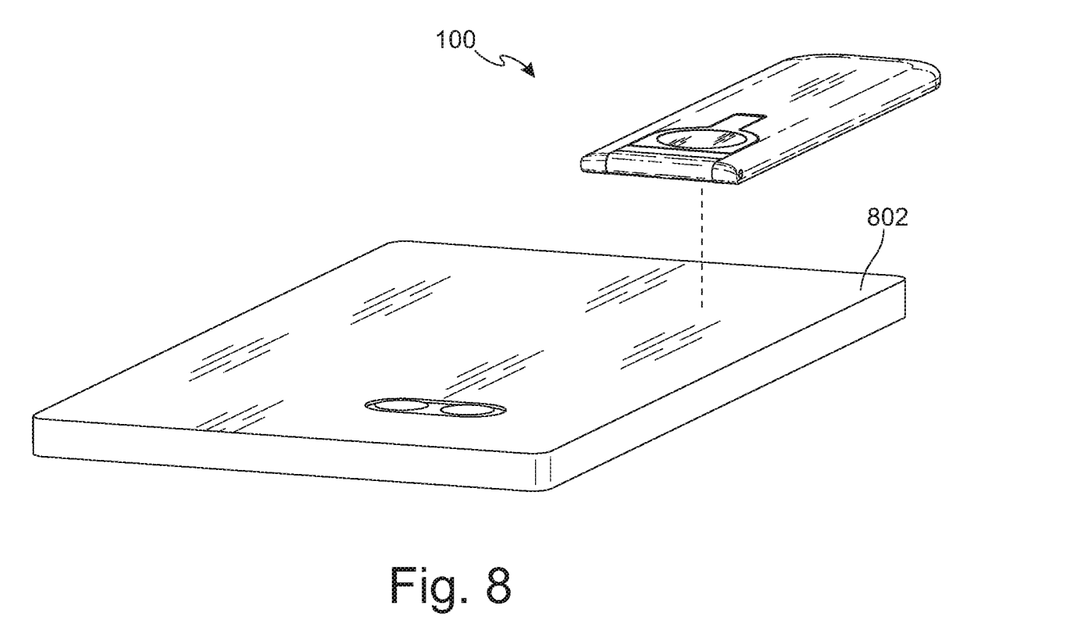
FIG. 8 is an isometric view of the exterior side of the handle system in the closed configuration and in a mounting phase of operation.

When the handle system 100 is assembled, the handle 124 may be rotated in both horizontal and vertical directions, as compared to the user device 802 of FIG. 8 to which it is affixed.

The finger groove 146 as depicted more clearly in FIG. 1, for example, may preferably be placed at the lower end of handle 124. The finger groove 146 can allow the user to easily flip and rotate the handle 124 of the present disclosure.

The handle 124 may preferably include the raised support structures 136 of FIG. 1. The mirror 138 of FIG. 1 may preferably be affixed to the raised support structures 136. The raised support structures 136 can provide support for mirror 138 and can hold it in place without any warping due to changed environmental conditions such as changes in ambient humidity and temperatures. The raised support structures 136 further serves to absorb impacts, such that mirror 138 will not easily be damaged or broken when the handle system 100 is transported, dropped, or otherwise undergoes stress or strain.

The mirror 138 may preferably be affixed to the raised support structures 136 with the use of adhesives known in the art, such as industrial glue, or other equivalent adhesive. The adhesive may preferably be placed onto the back of the mirror 138, such that it is firmly affixed to the raised support structures 136.

The mirror 138 may preferably be sized between 1.0625 inches in width and 2.125 inches in length, though other dimensions are also contemplated. The mirror 138 may preferably lie flush with the handle 124 when affixed. The thin nature of the mirror 138 allows the overall weight of the handle system 100 to be minimized.

The handle 124 may also preferably include the handle magnets 128, which are affixed to handle magnet pockets 150. The handle magnets 128 may preferably be affixed to handle magnet pockets 150 with the use of adhesives known in the art, such as industrial glue, or other equivalent adhesive. The handle magnet pockets 150 may preferably consist of a recessed rectangular area that comfortably houses a small magnet. The handle magnets 128 may preferably be sized between 0.35 inches in width and 0.25 inches in length, though other dimensions are also contemplated.

The handle magnets 128 can correspond to middle component magnets 116 within the middle component 112. When the middle component magnets 116 are connected to the middle component 112, The middle component 112 can be locked such that it remains flush against the handle 124. Alternatively, the connection between the handle magnets 128 and the middle component magnets 116 can be broken, so that the middle component 112 can be levered vertically with respect to handle 124. In that manner, the attached user device 802 may be angled up and down.

In addition, the middle component 112 can be angled out away from the handle 124 such that the handle 124 can function as a stand for the user device 802. In particular, the handle 124 may be levered out vertically such that it provides a support for the user device 802. As described herein, the user device 802 can then rest against the handle 124. The user device 802 can be placed at a vertical, horizontal, or angular position when it rests against the stand, as described herein. In that manner, the user may view content on the user device 802 while reclining, or while in a variety of positions.

The handle 124 preferably includes the recess 132. As described herein, the user device 802 may be attached to the base component 102 which is rotateably coupled to the middle component 112. The recess 132 allows the middle component 112 along with the base component 102 completely into the handle 124 when the handle 124 is in the closed configuration.

The handle 124 can attach to the middle component 112 with a hinge. The middle component 112 may preferably be formed from the same lightweight plastic as the handle 124, or from a comparable material known in the art. The middle component 112 preferably includes the hinge hole 120. The hinge hole 120 consists of a small, hollow tube that can hold the hinge pin 122 of FIG. 1. The hinge pin 122 may preferably be formed from an aluminum alloy, or other lightweight, yet sturdy material. The hinge pin 122 is slightly longer in length than the hinge hole 120. The circumference of the hinge pin 122 is such that it fits through, and is held securely by, the hinge hole 120. The hinge pin 122 may preferably have the following dimensions: 0.063 inches in diameter and 1.25 inches in length. Other dimensions are also contemplated.

The handle 124 includes the hinge anchor holes 126 on both sides of the handle 124. The hinge anchor holes 126 preferably have the same circumference as the hinge hole 120. When the hinge pin 122 is inserted through the hinge hole 120, the middle component 112 may then be affixed to the handle 124 by placing the ends of the hinge pin 122 into the hinge anchor holes 126.

The middle component 112 can further include the middle component magnet pockets 148. The middle component magnet pockets 148 may preferably be of the same dimension as the handle magnet pockets 150. The middle component magnets 116 may be affixed to the middle component magnet pockets 148 with the use of adhesives known in the art, such as industrial glue, or other equivalent adhesive. When the middle component magnets 116 are affixed to middle component magnet pockets 148, the top of the handle magnets 128 can be flush with the top of the middle component magnets 116 when the handle is in the closed configuration.

The middle component magnets 116 can be attracted to the handle magnets 128, such that when the handle system 100 is not placed into use, the middle component 112 can be locked into place against the handle 124. The middle component 112 can include the middle component circular cutout 114. The middle component circular cutout 114 provides a housing for the screw 110, as described herein.

The screw 110 may preferably be attached to the middle component 112 via base component 102. The device facing surface 106 of the base component 102 is affixed to the user's device 802. The surface opposite the device facing surface 106 can be coupled to the middle component 112, such that the middle component 112 lies snugly around base component circular cutout 104. The base component 102 may be affixed to the middle component 112 with the screw 110.

The base component circular cutout 104 is sized such that the screw 110 fits snugly within the base component circular cutout 104. The base component circular cutout 104 preferably include threads 302, which connect to threaded elements on the screw 110. In that manner, the screw 110 may be screwed into the base component circular cutout 104.

The device facing surface 106 may preferably be covered with a known adhesive 108. The adhesive 108 affixes the user's device 802 securely to the base component 102 of the handle system 100.

Referring now to FIG. 4, therein is shown an isometric view of the exterior side 402 of the handle system 100 in a closed configuration. The exterior side 402 of the handle system can be the surfaces of the handle 124 opposite the mirror 138 of FIG. 1.

The handle 124 is depicted in a closed configuration with the screw 110 exposed from the recess 132. The closed configuration of the handle 124 is depicted with the middle component 112 within the recess 132, the support bar 130 of FIG. 1 within the support bar recess 118 of FIG. 1, the magnetic fields 204 of the handle magnets 128 of FIG. 1 and the middle component magnets 116 of FIG. 1 are engaged.

The handle 124 and the middle component 112 can be secured in one position relative to the base component 102 based on the base component 102 being in contact with the handle 124 within the recess 132.

Referring now to FIG. 5, therein is shown an isometric view of the interior side 202 of the handle system 100 in the closed configuration. The screw 110 is depicted with a flange 502, which can lie flush with the device facing surface 106.

When the handle system 100 is assembled, the middle component 112 can rotate about a non-threaded section of the screw 110. The threaded section of the screw 110 will remain fixed in place. The middle component 112 can rotate about the screw 110 when the user desires to rotate the handle 124.

In the closed configuration, the base component 102 is shown entirely within the recess 132 of the handle 124. That is, the device facing surface 106 can be flush with the interior side 202.

Further, as will be appreciated, the handle 124 is not able to rotate with respect to the base component 102 due to the base component 102 being fulling within the recess 132 and in direct contact with the side wall 134 of the recess 132.

Referring now to FIG. 6, therein is shown an isometric view of the interior side 202 of the handle system 100 in a semi-closed configuration. The semi-closed configurations is depicted with the handle 124 rotatable with respect to the base component 102 based on the base component 102 being outside the recess 132, and based on the magnetic fields 204 of the handle magnets 128 and the middle component magnets 116 being engaged.

The handle 124 is shown hinged out away from the middle component 112 while still having the handle magnets 128 engaged with the middle component magnets 116. As the handle 124 is hinged further out away from the middle component 112, the handle magnets 128 will disengage with the middle component magnets 116 and the handle 124 will be considered in the open configuration.

Referring now to FIG. 7, therein is shown an isometric view of the interior side 202 of the handle system 100 in the semi-closed configuration. The handle 124 and the middle component 112 are shown rotated with respect to the base component 102. In the current configuration the handle system 100 would not be collapsible to the closed configuration base on the base component 102 not being able to fit within the recess 132 of the handle 124 in its currently depicted rotation.

It is contemplated that the base component 102 could be other geometric configurations in order to give more or fewer angle options for the handle 124 to lock into. That is, as the base component 102 fits into and mates with the recess 132, in order to determine the rotational position of the handle 124 with respect to the base component 102, more surfaces resulting in an octagonal base component 102, for example, would allow for 8 different rotational positions of the handle 124 in the closed configuration. As will be appreciated, the square base component 102 will allow four different rotational positions of the handle 124 relative to the base component 102 in the closed configuration.

Illustratively, with the base component 102 being square, the handle 124 can be rotated and fixed into the closed position at 0, 90, 180, and 270 degrees, relative to the base component 102.

Referring now to FIG. 8, therein is shown an isometric view of the exterior side 402 of the handle system 100 in the closed configuration and in a mounting phase of operation. The handle system 100 can be seen being mounted to a user device 802.

The user device 802 can be a mobile device or an electronic device. It has been discovered that mounting the handle system 100 near a corner of the user device 802 away from an exposed camera of the user device 802 can provide enhanced effectiveness and ergonomics.

Figure 9:
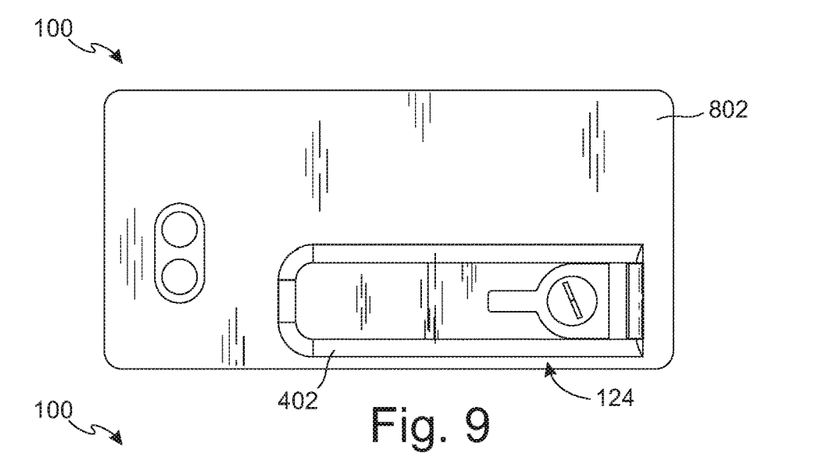
FIG. 9 is a side view of the exterior side of the handle system of FIG. 8 in the closed configuration.

Referring now to FIG. 9, therein is shown an isometric view of the exterior side 402 of the handle system 100, of FIG. 8 in the closed configuration. In the present rotation, the handle system 100 is attached to the user device 802, the mirror 138 of FIG. 1 can rest against the back of the user device 802, when the handle 124 is in the closed configuration, and is therefore hidden from view.

The handle 124 may be rotated 360 degrees with respect to the base component 102 of FIG. 1 while in the semi-closed configuration or the open configuration. The handle 124 can also be locked into a rotational position of 0, 90, 180, or 270 degrees, with respect to the base component 102, while in the closed configuration.

Figure 10:
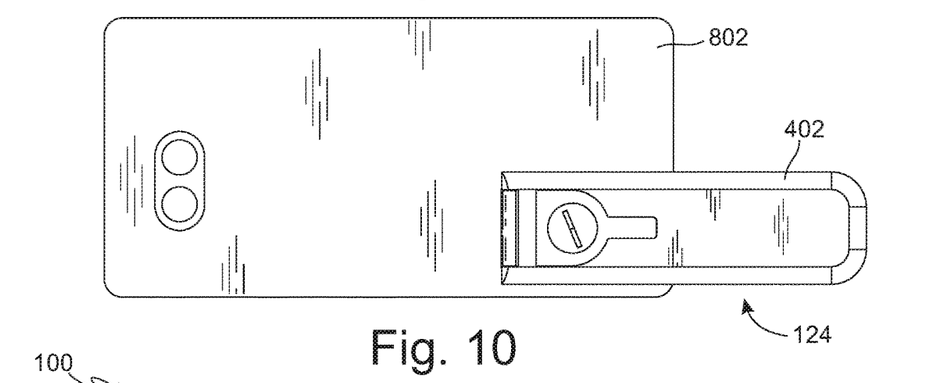
FIG. 10 is a side view of the exterior side of the handle system, of FIG. 8 in the closed configuration.

Referring now to FIG. 10, therein is shown an isometric view of the exterior side 402 of the handle system 100, of FIG. 8 in the closed configuration. In one rotation, the handle system 100 is attached to the user device 802, the mirror 138 of FIG. 1 can rest against the back of the user device 802, when the handle 124 is in the closed configuration, and is therefore hidden from view.

The handle 124 may be rotated 360 degrees with respect to the base component 102 of FIG. 1 while in the semi-closed configuration or the open configuration. The handle 124 can also be locked into a rotational position of 0, 90, 180, or 270 degrees, with respect to the base component 102, while in the closed configuration. As is depicted, the handle 124 has been rotated 180 degrees from a position where the mirror 138 is against the user device 802.

The handle 124 may swing when in the semi-closed configuration or the open configuration such that it is at a 90-degree angle with respect to the user device 802. In that configuration, the mirror 138 is visible to the user.

The handle 124 may lever or hinge up from the user device 802, vertically away from the closed configuration and the user device 802. Alternatively, the handle 124 may be rotated 90 degrees with respect to the user device 802 and the handle 124 be affixed in the closed configuration in a horizontal position. The handle 124 may also then lever upwards from its horizontal position. The shape of base component 102 is such that the handle 124 will lock into place when it is at the following angles with respect to the mobile electronic device: 0, 90, 180, and 270 degrees. Locking into these rotational positions is understood to be the closed configuration.

When in the semi-closed configuration, the handle 124 will be pulled back toward the closed configuration because the handle magnets 128 of FIG. 1 are engaged with the middle component magnets 116 of FIG. 1. Due to the relative shapes of the base component 102, the handle 124 will lock or snap into the closed configuration based on the force of the handle magnets 128 pulling against the middle component magnets 116 at 0, 90, 180, and 270 and degrees.

The handle 124 can make a clicking sound as it locks into each possible locking position when placed in the closed configuration. That rotational ability, combined with the clicking sound, allows the user to spin the handle 124 while in the semi-closed configuration or the open configuration, and use the invention as an entertainment device.

As shown, each element is designed such that it has a minimal thickness. In the preferred embodiment, the thickness of each element does not exceed 0.15748 inches. As a result, the overall device, when assembled, remains slender and does not add significant bulk to the user device 802.

Further, the structural design of the medial ridge 142 of FIG. 1, the medial ridge hole 144 of FIG. 1, the shape of the base component 102 with respect to the shape of the recess 132, and the positioning of the magnets provides greatly enhanced structural rigidity and miniaturization.

Figure 11:
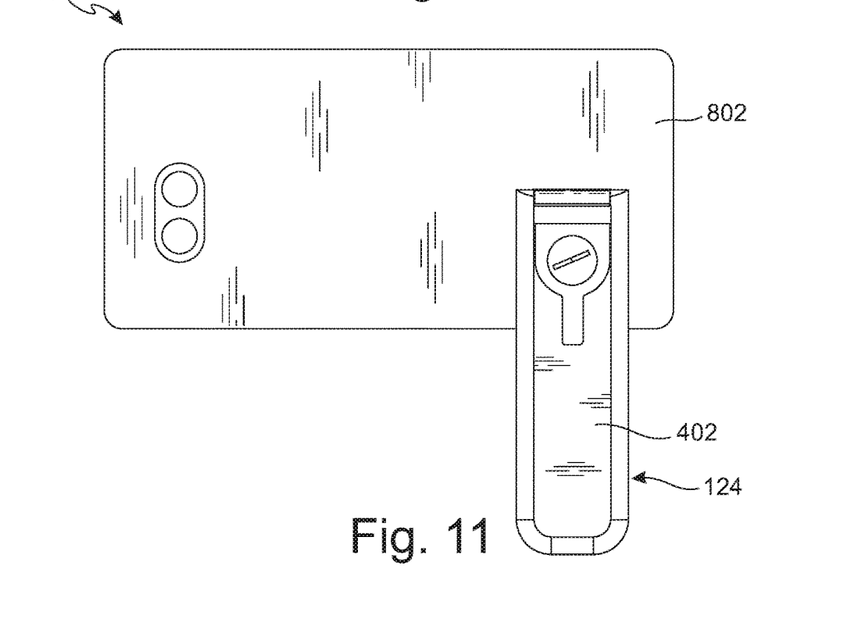
FIG. 11 is a side view of the exterior side of the handle system, of FIG. 8 in the closed configuration.

Referring now to FIG. 11, therein is shown an isometric view of the exterior side 402 of the handle system 100, of FIG. 8 in the closed configuration. The handle 124 is shown locked in a position orthogonal to the user device 802.

Figure 12:
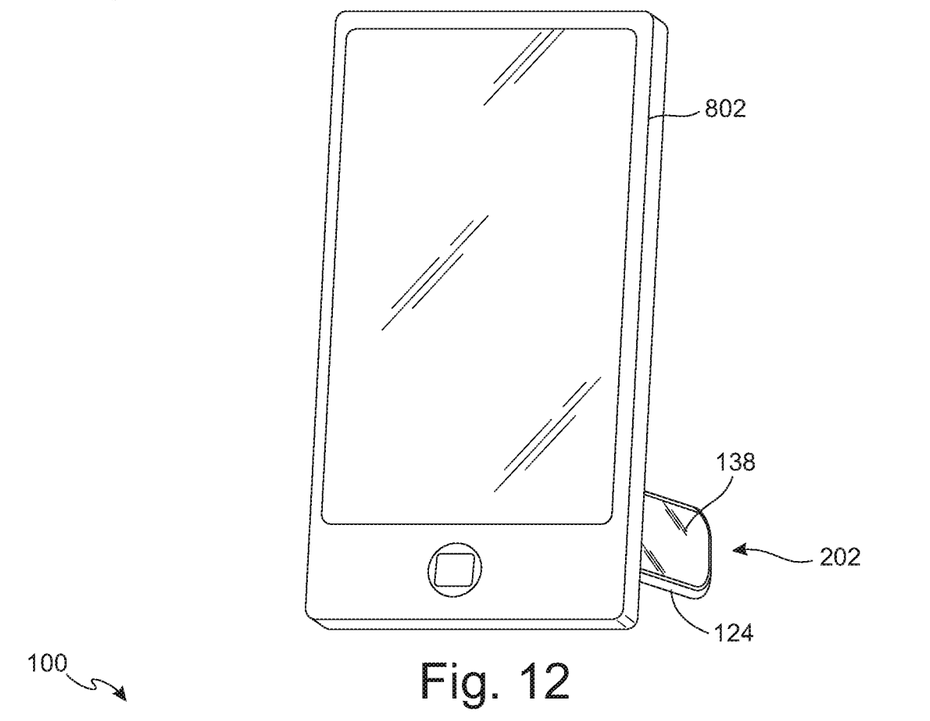
FIG. 12 is an isometric view of the interior side of the handle system, of FIG. 8 in the open configuration.

Referring now to FIG. 12, therein is shown an isometric view of the interior side 202 of the handle system 100, of FIG. 8 in the open configuration. The mirror 138 is shown on the handle 124 extending back away from the user device 802.

It is contemplated that the user device 802 could be set upright on a flat surface with the handle 124 used as a support. The handle 124 will not be forced back into the semi-closed or closed configuration since the handle magnets 128 of FIG. 1 and the middle component magnets 116 of FIG. 1 are not engaged. Thus the handle 124 can swing and move freely by hinging away from the user device 802 as well as rotationally with respect to the user device 802 and the base component 102.

Figure 13:
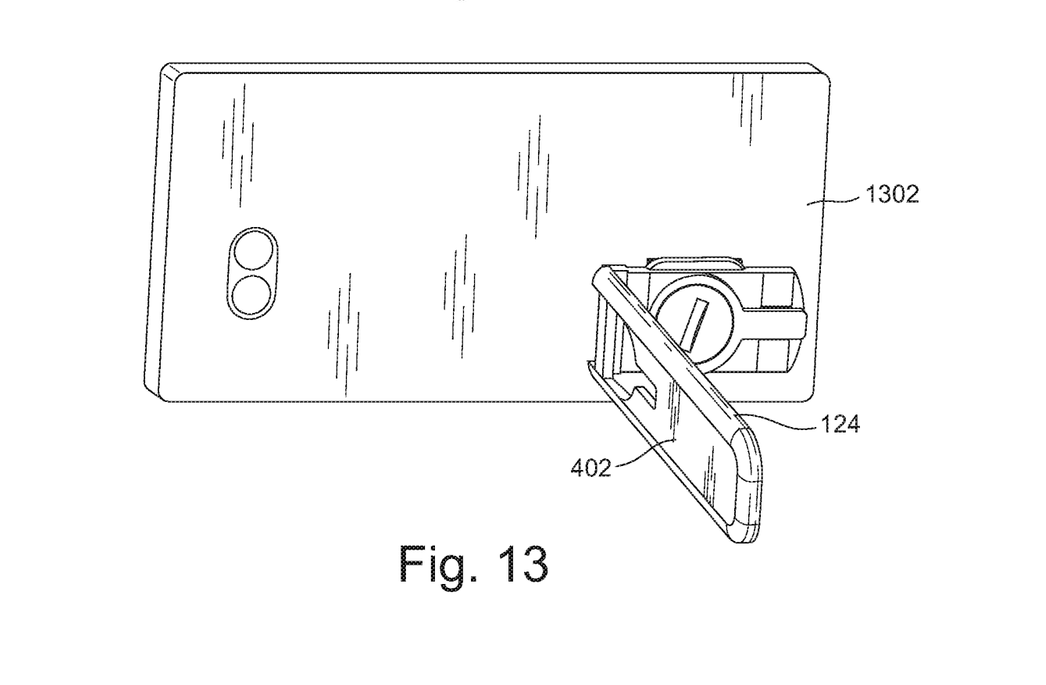
FIG. 13 is an isometric view of the exterior side of the handle system of FIG. 1.

Referring now to FIG. 13, therein is shown an isometric view of the exterior side 402 of the handle system 100 of FIG. 1. The handle system 100 is shown with the base component 102 integrally formed with a case 1302.

The case 1302 can be a cellular phone case or an external case for a tablet computer, for example. The base component 102 can be formed of the same material as the case 1302 and is depicted extended away from the case 1302 and within the open configuration.

Figure 14:
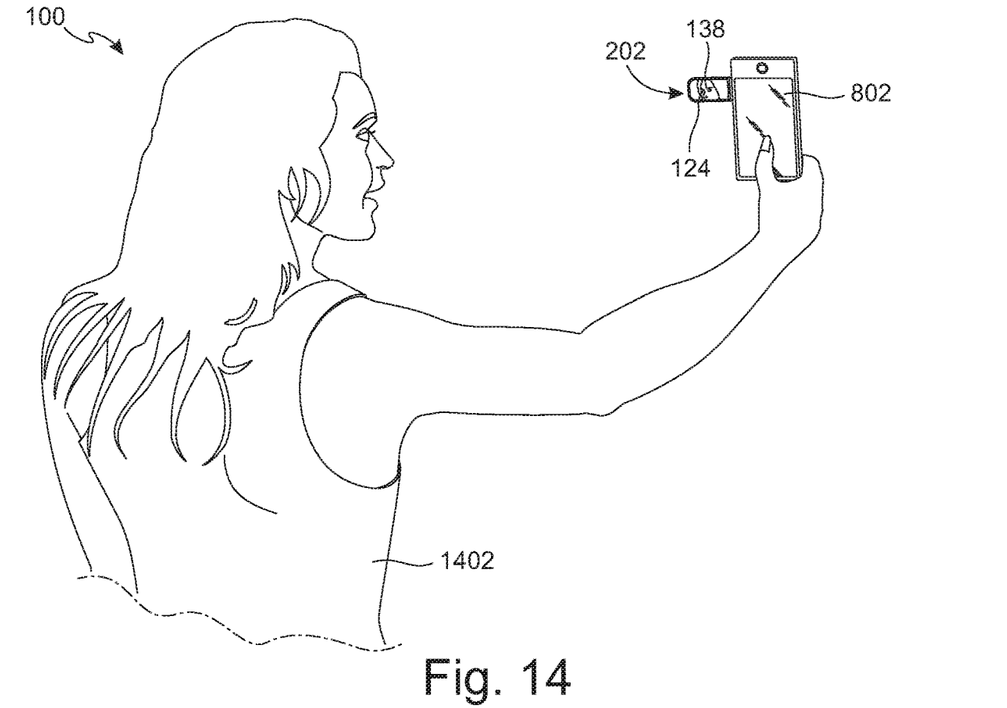
FIG. 14 is an isometric view of the interior side of the handle system in a closed configuration.

Referring now to FIG. 14, therein is shown an isometric view of the interior side 202 of the handle system 100 in a closed configuration. The handle 124 is shown extended out away from the user device 802 with the mirror 138 exposed so that the user 1402 can be seen within the mirror 138. The mirror 138 can provide image checks and image alignment designed into the structure of the handle system 100.

Figure 15:
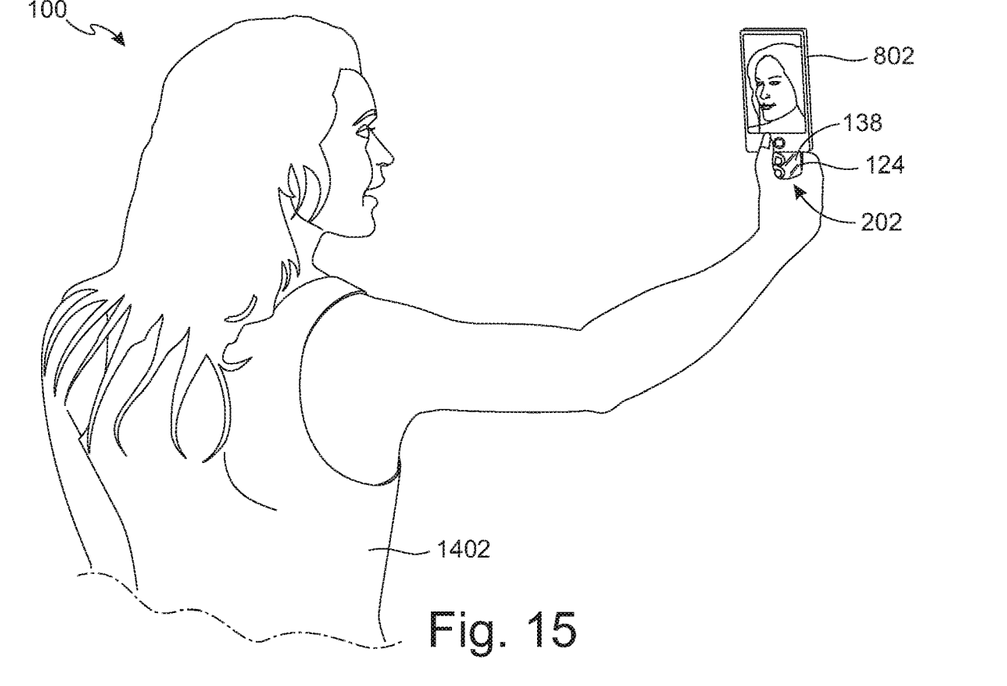
FIG. 15 is an isometric view of the interior side of the handle system in a closed configuration.

Referring now to FIG. 15, therein is shown an isometric view of the interior side 202 of the handle system 100 in a closed configuration. The handle 124 is depicted having the mirror 138 facing the user 1402 and locked into the closed configuration for use as a rigid handle for the user device 802.

Figure 16:
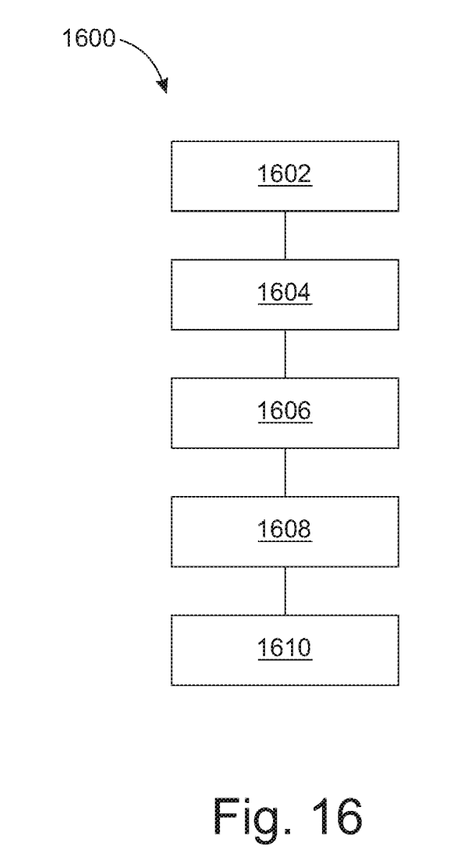
FIG. 16 is a flow chart for a method of manufacturing the multi-functional handle system.

Referring now to FIG. 16, therein is shown a flow chart 1600 for a method of manufacturing the multi-functional handle system 100. The method can include: providing a base component having a base component circular cutout and a device facing surface, the device facing surface for coupling the base component in a fixed position relative to the mobile device in a block 1602; mounting a screw through the base component circular cutout in a block 1604; rotatably affixing a middle component to the base component, the middle component having a middle component circular cutout, a middle component magnet, and a hinge hole, the middle component with the screw extended through the base component circular cutout and through the middle component circular cutout in a block 1606; mounting a hinge pin extended through the hinge hole of the middle component in a block 1608; and coupling a handle to the middle component, the handle having a hinge anchor hole, a handle magnet, and a recess, the hinge anchor hole along a side wall of the recess, the handle magnet within the recess, the handle hingeably affixed to the middle component with the hinge pin extended from the hinge hole of the middle component into the hinge anchor hole of the handle, and the handle including: a closed configuration with the middle component within the recess, the handle magnet and the middle component magnet engaged, and the handle and the middle component secured in one position relative to the base component based on the base component being in contact with the handle within the recess, a semi-closed configuration with the handle rotatable with respect to the base component based on the base component being outside the recess, and with the handle magnet and the middle component magnet being engaged, and an open configuration with the handle rotatable with respect to the base component based on the base component being outside the recess, and the handle freely moveable about the hinge pin based on the handle magnet and the middle component magnet not being engaged in a block 1610 electronic device.

Thus, it has been discovered that the handle system furnishes important and heretofore unknown and unavailable solutions, capabilities, and functional aspects. The resulting configurations are straightforward, cost-effective, uncomplicated, highly versatile, accurate, sensitive, and effective, and can be implemented by adapting known components for ready, efficient, and economical manufacturing, application, and utilization.

While the handle system has been described in conjunction with a specific best mode, it is to be understood that many alternatives, modifications, and variations will be apparent to those skilled in the art in light of the preceding description. Accordingly, it is intended to embrace all such alternatives, modifications, and variations, which fall within the scope of the included claims. All matters set forth herein or shown in the accompanying drawings are to be interpreted in an illustrative and non-limiting sense.

The handle of the present disclosure may easily be affixed to mobile electronics, such as smartphones, tablets, or other similar devices. In that manner, the device of the present disclosure may be transported along with the mobile electronic device, without adding significant bulk or weight. The device of the present disclosure is designed to be sleek and lightweight, and ergonomic. The user may hold the handle in order to use the device at a distance. Alternatively, the user may rest the device on the handle, such that the handle functions as a stand. Functioning as a stand, the handle can hold the device up for easy viewing on uneven and non-rigid surfaces, such as pillows, soft bedding, couch cushions or car dashboards.

A vanity mirror may preferably be attached to the device facing side of the handle. In that manner, the mirror lies flush against the mobile electronic device and is not visible when the handle is not placed in use. However, the user may easily rotate the arm out away from the mobile device to which it is fixed in a horizontal fashion, in order to make the mirror visible. When the handle is rotated out horizontally, the mirror is perpendicular to the mobile electronic device. The front of the mirror is pointed toward the user just as the front side of the mobile electronic device is pointed toward the user. The mirror provides numerous benefits to the user. For example, the mirror allows the user to check their appearance prior to taking a photograph of themselves, or prior to answering a video call. The mirror may also be quickly used for other purposes, such as prior to entering into a meeting. That allows the user to always have a readily available mirror, without need to carry a separate mirror in a pocket or bag. As described herein, the device of the present disclosure is designed such that the mirror will not warp under changed environmental conditions, and will not be easily broken.

The rotating feature of the handle also allows it to be employed as a toy, or stress-reducing device. Recently the devices known as "Fidget Spinners" have gained in popularity. Such devices allow users to both release stress and increase concentration. The repetitive motion of operating a device such as a "Fidget Spinner" can ameliorate symptoms of attention deficit hyperactivity disorder, anxiety, and autism. The device of the present disclosure may also provide stress relieving, concentration enhancing, and entertainment features by allowing the user to spin the handle separately from the attached mobile electronic device. As described herein, the handle makes a clicking motion as it turns. The combined spinning motion and clicking sounds allow the user to relieve stress and anxiety, and receive entertainment, even when the mobile electronic device is not placed into use.

The top edges of the base component are slightly angled so as to enable a smooth transition from the locked to unlocked positions. Accordingly, when the user rotates the handled horizontally from the locked position (as opposed to lifting the handled up in a vertical direction, rotating horizontally and then rotating back down in a vertical direction), the handled with "pop" out of its locked position allowing the user to rotate it to the next position. The angled edges allow the handle to pop out of the locked position without causing any damage to the components. The motion of "popping" the handled in and out of the locked positions also serves to enhance the entertainment or stress relieving feature of the device.

The handle of the multi-functional handle system and method may stabilize the mobile electronic device in various positions, so that the mobile electronic device can be used at a distance from the user. Such functionality can, for example, assist the user in taking pictures at various angles. The attachable handle of the multi-functional handle system and method may also act as a stand that allows the user to use the mobile electronic device for an extended period of time, without the need to hold the device. The multi-functional handle system and method, further includes a vanity mirror, and also functions as a stress-relieving and entertainment device.

What is claimed is:

1. A multi-functional handle system for a mobile device comprising:
   a base component having a base component circular cutout and a device facing surface, the device facing surface for coupling the base component in a fixed position relative to the mobile device;
   a screw extended through the base component circular cutout;

a middle component having a middle component circular cutout, a middle component magnet, and a hinge hole, the middle component rotateably affixed to the base component with the screw extended through the base component circular cutout and through the middle component circular cutout;

a hinge pin extended through the hinge hole of the middle component; and a handle having a hinge anchor hole, a handle magnet, and a recess, the hinge anchor hole along a side wall of the recess, the handle magnet within the recess, the handle hingeably affixed to the middle component with the hinge pin extended from the hinge hole of the middle component into the hinge anchor hole of the handle, and the handle including:

a closed configuration with the middle component within the recess, the handle magnet and the middle component magnet engaged, and the handle and the middle component secured in one position relative to the base component based on the base component being in contact with the handle within the recess, a semi-closed configuration with the handle rotateable with respect to the base component based on the base component being outside the recess, and with the handle magnet and the middle component magnet being engaged, and an open configuration with the handle rotateable with respect to the base component based on the base component being outside the recess, and the handle freely moveable about the hinge pin based on the handle magnet and the middle component magnet not being engaged.

2. The system of claim 1 wherein the handle includes raised support structures within a portion of the handle adjacent to the recess.

3. The system of claim 1 further comprising a mirror affixed to the handle, the mirror affixed to a surface of the handle facing a same direction as the device facing surface based on the handle being in the closed configuration.

4. The system of claim 1 further comprising adhesive coupling the base component to the mobile device.

5. The system of claim 1 wherein the screw is exposed from the recess based on the handle being in the closed configuration.

6. A multi-functional handle system for a mobile device comprising:

a base component having a base component circular cutout and a device facing surface, the device facing surface for coupling the base component in a fixed position relative to the mobile device;

a screw extended through the base component circular cutout;

a middle component having a middle component circular cutout, a middle component magnet, a support bar recess, and a hinge hole, the middle component rotateably affixed to the base component with the screw extended through the base component circular cutout and through the middle component circular cutout, the base component extended past the middle component in a direction coplanar with the device facing surface;

a hinge pin extended through the hinge hole of the middle component; and a handle having a hinge anchor hole, a handle magnet, a support bar, and a recess, the support bar extended across the recess, the hinge anchor hole along a side wall of the recess, the handle magnet within the recess, the handle hingeably affixed to the middle component with the hinge pin extended from the hinge hole of the middle component into the hinge anchor hole of the handle, and the handle including:

a closed configuration with the middle component within the recess, the support bar within the support bar recess, the handle magnet and the middle component magnet engaged, and the handle and the middle component secured in one position relative to the base component based on the base component being in contact with the handle within the recess, a semi-closed configuration with the handle rotateable with respect to the base component based on the base component being outside the recess, and with the handle magnet and the middle component magnet being engaged, and an open configuration with the handle rotateable with respect to the base component based on the base component being outside the recess, and the handle freely moveable about the hinge pin based on the handle magnet and the middle component magnet not being engaged.

7. The system of claim 6 wherein the base component includes beveled corners for smoother rotation of the handle relative to the base component when the handle is in the semi-closed configuration.

8. The system of claim 6 wherein:
the middle component includes a medial ridge extended up away from the base component;
the handle includes a medial ridge hole within the recess; and
the medial ridge extends into the medial ridge hole based on the handle being in the closed configuration.

9. The system of claim 6 wherein the screw is fixed and not rotateable with respect to the base component.

10. The system of claim 6 wherein the handle includes a finger groove opposite the hinge anchor hole.

11. A method of manufacturing a multi-functional handle system for a mobile device comprising:

providing a base component having a base component circular cutout and a device facing surface, the device facing surface for coupling the base component in a fixed position relative to the mobile device;

mounting a screw through the base component circular cutout;

rotateably affixing a middle component to the base component, the middle component having a middle component circular cutout, a middle component magnet, and a hinge hole, the middle component with the screw extended through the base component circular cutout and through the middle component circular cutout;

mounting a hinge pin extended through the hinge hole of the middle component; and coupling a handle to the middle component, the handle having a hinge anchor hole, a handle magnet, and a recess, the hinge anchor hole along a side wall of the recess, the handle magnet within the recess, the handle hingeably affixed to the middle component with the hinge pin extended from the hinge hole of the middle component into the hinge anchor hole of the handle, and the handle including:

a closed configuration with the middle component within the recess, the handle magnet and the middle component magnet engaged, and the handle and the middle component secured in one position relative to the base component based on the base component being in contact with the handle within the recess, a semi-closed configuration with the handle rotateable with respect to the base component based on the base component being outside the recess, and with the handle magnet and the middle component magnet being engaged, and an open configuration with the handle rotateable with respect to the base component based on the base component being outside the recess, and the handle freely moveable about the hinge pin based on the handle magnet and the middle component magnet not being engaged.

12. The method of claim 11 wherein coupling the handle includes coupling the handle having raised support structures within a portion of the handle adjacent to the recess.

13. The method of claim 11 further comprising affixing a mirror to the handle, the mirror affixed to a surface of the handle facing a t e-same direction as the device facing surface based on the handle being in the closed configuration.

14. The method of claim 11 further comprising coupling the base component to the mobile device with an adhesive.

15. The method of claim 11 wherein coupling the handle includes coupling the handle with the screw exposed from the recess based on the handle being in the closed configuration.

16. The method of claim 11 wherein:
rotateably affixing the middle component includes rotateably affixing the middle component having a support bar recess, and the base component extended past the middle component in a direction coplanar with the device facing surface;

coupling the handle includes coupling the handle having a support bar, the support bar extended across the recess, and the support bar within the support bar recess based on the handle being in the closed configuration.

17. The method of claim 16 wherein providing the base component includes providing the base component with beveled corners for smoother rotation of the handle relative to the base component when the handle is in the semi-closed configuration.

18. The method of claim 16 wherein:
rotateably affixing the middle component includes rotateably affixing the middle component having a medial ridge extended up away from the base component; and
coupling the handle includes coupling the handle having a medial ridge hole within the recess, and the medial ridge extends into the medial ridge hole based on the handle being in the closed configuration.

19. The method of claim 16 wherein mounting the screw includes mounting the screw in a fixed position with respect to the base component.

20. The method of claim 16 wherein coupling the handle includes coupling the handle having a finger groove opposite the hinge anchor hole.

* * * * *